3,257,346
RUBBERY POLYMER-ACIDIC CARBON BLACK-CARBOXYLIC ACID MIXTURES CURED WITH ORGANIC PEROXIDES
Jerry T. Gruver and Gerard Kraus, Bartlesville, Okla., assignors to Phillips Petroleum Company, a corporation of Delaware
No Drawing. Filed Aug. 7, 1961, Ser. No. 129,524
10 Claims. (Cl. 260—23)

This invention relates to a method of curing polymeric materials to produce low modulus rubber stocks. One aspect of this invention relates to a process of reacting polymeric materials and highly acidic carbon blacks in an improved curing system. Another aspect of this invention relates to the resulting cured product of such a process. In a still further aspect, this invention relates to a method of utilizing acidic carbon blacks as reinforcing agents for polymeric materials.

For a number of purposes there is a need for low modulus rubbers. One area in which there is an increasing demand for such low modulus rubbers is in the manufacture of "no squeal" tires for passenger vehicles. It has been observed that acidic carbon blacks, particularly attrited blacks of low structure, when used as reinforcing agents in compounding of rubber, results in a marked reduction in the modulus of the cured stock. However, when used in conventional compounding procedures, these acidic carbon blacks frequently retard the cure.

It has now been discovered that natural rubbers and synthetic rubbers such as conjugated diene homopolymers, copolymers of conjugated dienes with compounds containing a vinyl group, and copolymers of monoolefins such as ethylene-propylene and ethylene-butadiene copolymers and the like, combined with highly acidic carbon blacks can be cured to low modulus rubbers by the incorporation in the recipe of an organic peroxide and a metal oxide plus a high molecular weight organic acid or an organic peroxide and a metal salt of a high molecular weight fatty acid.

Therefore, it is an object of the invention to provide an improved method of curing polymeric materials with highly acidic carbon blacks. Another object of this invention is to provide a process wherein polymeric materials and highly acidic carbon blacks can be reacted with curatives to produce an improvement in the physical properties of the material. Another object is to provide a polymeric material having improved physical properties as a result of the addition of highly acidic carbon black and being reacted with a multicomponent curing system. Other aspects and several advantages of this invention will be apparent from a study of the disclosure and the appended claims.

The materials which can be treated for improvements in properties according to this invention are natural rubber and synthetic rubbery polymers of conjugated diene monomers. Included among these polymers are homopolymers of conjugated dienes having from 4 to 12 carbon atoms, preferably the polymers of conjugated dienes having 4 to 8 carbon atoms per molecule, such as:

1,3-butadiene
    Isoprene
    Piperylene
    2-methyl-1,3-pentadiene
    Phenylbutadiene
    3,4-dimethyl-1,3-hexadiene
    4,5-diethyl-1,3-octadiene
    Chloroprene
    Fluoroprene
    2-methyl-1,3-hexadiene and the like. Among these, butadiene, isoprene and piperylene are preferred. In addition, suitable materials include copolymers of the above-mentioned conjugated dienes with compounds containing a vinylidene group, such as isobutylene, styrene, p-methoxystyrene, vinylnaphthalene, vinyltoluene, heterocyclic nitrogen-containing monomers such as pyridine and quinoline derivatives containing at least one vinyl or alpha-methylvinyl group, such as 2-vinylpyridine and 2-methyl-5-vinylpyridine, acrylic and alkacrylic acid esters, such as methyl acrylate, ethyl acrylate, and methyl methacrylate, methyl vinyl ether, vinyl chloride, vinylidene chloride, and the like. Polymers containing acidic groups along the polymer chain, such as polymers of acrylic acid or methacrylic acid copolymerized with diene monomers can also be cured with this system. The invention is also applicable to the compounding and curing of saturated rubbery polymers such as ethylene-propylene polymers, polyisobutylene and the like.

The metal oxides employed in this invention include the oxides of all metals of groups IA, II and III of the Mendeleeff periodic table, those preferred being oxides of bivalent metals or polyvalent metals in bivalent state. Typical of these are oxides of magnesium, zinc, cadmium, mercury, calcium, barium, strontium and lead.

The fatty or rosin acid used in the compounding recipe can be added per se or as salts of one of the meals named hereinbefore, it being understood that the metal salt serves as a replacement for the metal oxide and the organic acid. For example, instead of stearic acid and magnesium oxide, magnesium stearate can be used with equal or better results in the cured product. The preferred organic acids employed are those containing from 10 to 20 carbon atoms per molecule and include fatty acids such as capric, lauric, myristic, palmitic, margaric, stearic, arachidic, and rosin acids such as abietic acid. In some instances the high molecular weight acid is added prior to other compounding agents or it may be present in the rubber as a residue from the polymerization, this situation frequently occurring in emulsion polymerized rubbers.

Organic peroxides used in conjunction with this invention have the general formula:

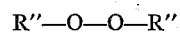

$$R''\text{—O—O—}R''$$

wherein each $R''$ is selected from the group consisting of alkyl, cycloalkyl, aryl, alkaryl, aralkyl, and acyl radicals containing from 1 to 15 carbon atoms. Examples of suitable organic peroxides include:

Dimethyl peroxide
Methyl ethyl peroxide
Di-tert-butyl peroxide
Di-tert-amyl peroxide
Di-n-hexyl peroxide
n-Butyl n-amyl peroxide
Dicyclohexyl peroxide
Dicyclopentyl peroxide
Di(methylcyclohexyl) peroxide
Diphenyl peroxide
Di-4-tolyl peroxide
Di(2,4,6-trimethylphenyl) peroxide
Phenyl benzyl peroxide
Tert-butyl phenyl peroxide
Dibenzoyl peroxide
Diacetyl peroxide
Dibenzyl peroxide
Bis(alpha-methylbenzyl) peroxide
Bis(alpha-ethylbenzyl) peroxide
Bis(alpha-n-propylbenzyl) peroxide
Bis(alpha-isopropylbenzyl) peroxide
Bis(alpha,alpha-dimethylbenzyl) peroxide, also referred to as dicumyl peroxide
Bis(alpha,alpha-diethylbenzyl) peroxide Bis(alpha,alpha-di-n-propylbenzyl) peroxide
Bis(alpha,alpha-diisopropylbenzyl) peroxide
Bis(alpha-methyl-alpha-ethylbenzyl) peroxide
Bis(alpha-ethyl-alpha-isopropylbenzyl) peroxide
Bis(alpha-methyl-alpha-tert-butylbenzyl) peroxide
Bis(alpha,alpha-dimethyl-3-methylbenzyl) peroxide
Bis(alpha,alpha-diethyl-2-ethylbenzyl) peroxide
Bis(alpha-methyl-alpha-ethyl-3-tert-butylbenzyl) peroxide
Bis(alpha,alpha-dimethyl-2,4-dimethylbenzyl) peroxide
Bis(alpha,alpha-dimethyl-4-isopropylbenzyl) peroxide
Bis(alpha,alpha-diisopropyl-4-ethylbenzyl) peroxide
Bis(alpha-methyl-alpha-ethyl-4-isopropylbenzyl) peroxide
Bis(alpha,alpha,diethyl-4-isopropylbenzyl) peroxide
Bis(alpha,alpha-diisopropyl-2-ethylbenzyl) peroxide
Bis(alpha,alpha-dimethyl-4-tert-butylbenzyl) peroxide
Bis(alpha,alpha-diethyl-4-tert-butylbenzyl) peroxide
Benzyl alpha-methylbenzyl peroxide
Benzyl alpha-methyl-4-methylbenzyl peroxide
Benzyl alpha-methyl-4-isopropylbenzyl peroxide
Benzyl alpha, alpha-dimethylbenzyl peroxide
Benzyl alpha,alpha-4-trimethylbenzyl peroxide
Benzyl alpha,alpha-dimethylbenzyl-4-isopropylbenzyl peroxide
Alpha,alpha,alpha'-trimethyldibenzyl peroxide
Alpha-methyl-alpha,alpha'-diethyl-alpha'-n-propyl-dibenzyl peroxide
Alpha-methyl-alpha,alpha',alpha'-triisopropyl-dibenzyl peroxide
Alpha,alpha-dimethyl-alpha',alpha'-di-n-butyldibenzyl peroxide
Bis[dimethyl(1-naphthyl)methyl] peroxide
Bis[diethyl(2-naphthyl)methyl] peroxide The amount of acidic carbon black used as a reinforcing agent in this invention is generally within the range from 20 to 100 parts by weight per 100 parts of polymer with about 40 to 60 parts being preferable. The amount of the metal oxide or metal salt of the fatty acid used will be in the range from 0.1 to 10.0 parts per hundred parts of polymer with 1.0 to 5.0 parts per hundred parts of polymer being preferable. When the organic acid is compounded per se, it will be present in the amount of between 0.1 to 10.0 parts per hundred parts of polymer. The amount of the organic peroxide employed is in the range from 0.1 to 10.1 parts per hundred parts of polymer, with 0.25 to 7.5 parts per hundred parts rubber being preferable.

The carbon blacks employed in the present invention are those having a pH value in the range from 2 to 6. Attrited carbon blacks having acidic properties may be used in this invention. The term "attrited carbon blacks" is used here to define carbon blacks that have been subjected to severe mechanical treatment, in which the secondary aggregates have been destroyed. Suitable blacks can be obtained by any of the various processes or treatments known to the art. One procedure by which highly acidic, low structure carbon blacks can be prepared involves subjecting a furnace black to vigorous milling in the presence of oxygen as in a succession of passes through a tight roll mill, in a ball mill, an ink mill or by similar means. By such treatment the secondary aggregates are altered and in the presence of oxygen, acidic properties are imparted thereto. Channel black and furnace blacks oxidized by air or chemical agents are also applicable in the process if their pH value falls in the range specified.

The pH value of the carbon black used in this invention is measured by ASTM procedure D-1512-57T modified by using 25 ml. water per gram of carbon black instead of 10 ml. and shortening the heating period to 10 minutes after which the water is cooled to room temperature and the pH is measured by use of a Beckman pH meter.

Incorporation of the acidic carbon black and other components of the recipe in the rubber is effected on a roll mill, in a Banbury mixer or by any similar means known to the art. When using the attrited blacks hereinbefore disclosed, it is frequently advantageous to add the organic acid or the metal salt or metal oxide to the carbon black prior to the grinding step, by which means these ingredients are intimately combined prior to incorporation in the rubbery polymer.

The curing or reacting temperature can vary over a broad range, for example from 200 to 500° F., although the temperature is generally in the range of 260 to 350° F. The time can also vary considerably from a few minutes to several hours, although usually a curing time of from 20 to 150 minutes is used. One skilled in the art in possession of this disclosure, having studied the same, will recognize that it is possible to vary somewhat the amounts or ratios given, depending upon the particular polymer, reacting agent and result desired. Thus, the reacting agent or curative can be used in lesser or greater amounts than those given but this now is not preferred. Thus, one skilled in the art will recognize that a basic concept is in the use of the reactant or curative rather than in the parts by weight when considering the broad aspects of the invention. The temperature at which reaction with the polymer will take place, though given herein as now preferred, can be varied somewhat outside the limits given depending upon the particular circumstances as one skilled in the art in possession of this disclosure will understand. Thus, the concept of the invention is to bring about the reaction and this one skilled in the art will know how to do, having studied this disclosure.

This invention provides a method for converting liquid, semi-solid, and solid polymers to vulcanized rubbery and cross-linked plastic products. A wide variety of polymer compositions which can be obtained include materials which are suitable as adhesives, potting compounds, tread stocks, and various types of molded objects.

The following examples are presented in illustration of the invention. However, the specific materials and conditions used are typical only and should not be construed to limit invention unduly.

*Example I*

A furnace carbon black having a pH value of 8.5 was subjected to milling alone and in admixture with magnesium oxide. In the first run, the black was ball-milled for 16 hours in air following 72 hours drying at 100° C. The mill was then opened, and the black was milled one additional hour. The pH was 5.2.

In the second run, 100 grams of dried furnace carbon black was mixed with 5 grams of magnesium oxide and ball-milled for 20 hours to produce a similar effect as is shown above. The products from these runs were designated as Black #1 and Black #2.

Butadiene-styrene rubber having a bound styrene content of about 23.5% and cis-polybutadiene were compounded with these blacks in a peroxide recipe using bis($\alpha,\alpha$ dimethylbenzyl) peroxide. The butadiene-styrene copolymer was prepared by emulsion polymerization at approximately 41° F. using a rosin acid soap and coagulated with salt-acid. The rosin acid content of the copolymer was about 6% by weight, and the Mooney value was (ML-4 at 212° F.) 50. Approximate values of the cis-polybutadiene used in the recipe were: cis content 96%, trans content 1.2%, vinyl content 2.8%, Mooney value (ML-4 at 212° F.) 45 and an inherent viscosity of 2.35. In these tests the recipe was varied by inclusion of magnesium oxide, stearic acid, and resin 731 (disproportionated pale rosin stable to heat and light). Physical properties were determined on stocks cured 45 minutes at 307° F.

From the data shown in Table I, it is demonstrated that when operating with a butadiene-styrene rubber, cure was poor in the stock containing the ball-milled black and that by addition of magnesium oxide a satisfactory cure was realized. When the magnesium oxide was included in the milling step, tensile strength was improved still more and modulus was lowered significantly. A comparison of these values shows that modulus is increased without improvement in tensile strength, and heat buildup is considerably higher in the controls using unmilled blacks. Addition of magnesium oxide to the receipe increases modulus over that of the control, with little change in tensile or heat buildup when unmilled black is used. Thus, for these runs, it is apparent that low-modulus stocks having significantly reduced heat buildup can be obtained by attrition of the black and including magnesium oxide in the recipe, preferably by grinding with the black.

Runs 6, 7 and 8 show that magnesium oxide alone, either introduced separately or milled with the black, fails to provide an effective cure when the polymer is cis-polybutadiene. When stearic acid and resin 731 are included in the recipe, good cure is obtained and stocks having high tensiles and low moduli are obtained.

tent 2.8%, Mooney value (ML-4 @ 212° F.) 45 and an inherent viscosity of 2.35. In these tests magnesium stearate was substituted for the magnesium oxide and stearic acid employed. Data on these tests are shown in Table II. Physical properties were determined on stocks cured 45 minutes at 307° F.

This example shows that cis-polybutadiene when compounded with ball-milled carbon black, magnesium stearate, and resin 731 has a lower modulus and lower heat buildup together with increased tensile strength over the same rubber compounded with unground black.

TABLE I

| Run | Compounding (parts by weight) | | | | | | | | | Physical properties | | | | | |
|---|---|---|---|---|---|---|---|---|---|---|---|---|---|---|---|
| | Butadiene styrene rubber [1] | Cis-polybutadiene | Carbon black | | | Bis(α, α' dimethyl-benzyl) peroxide | MgO | Stearic Acid | Resin 731 | Modulus 300 percent, p.s.i. | Tensile, p.s.i. | Elongation, percent | Shore hardness | ΔT, °F. | Resilience, percent |
| | | | #1 | #2 | Unmilled furnace carbon black | | | | | | | | | | |
| 1 | 100 | | 50 | | | 1.5 | 2.5 | | | 1,380 | 2,780 | 500 | 63 | 60.8 | 69.2 |
| 2 | 100 | | | 52.5 | | 1.5 | | | | 1,210 | 3,040 | 570 | 62 | 54.4 | 69.7 |
| 3 | 100 | | 50 | | | 1.5 | | | | 320 | 770 | 680 | 55 | (²) | 55.6 |
| 4 | 100 | | | | 50 | 1.5 | | | | 1,440 | 2,600 | 500 | 66 | 74.3 | 63.5 |
| 5 | 100 | | | | 50 | 1.5 | 2.5 | | | 2,090 | 2,680 | 390 | 70 | 70.9 | 67.0 |
| 6 | | 100 | 50 | | | 1.5 | 2.5 | | | 230 | 360 | 440 | 49 | (²) | 47.6 |
| 7 | | 100 | | 52.5 | | 1.5 | | | | 310 | 580 | 530 | 48 | (²) | 50.6 |
| 8 | | 100 | 50 | | | 1.5 | | | | 190 | 330 | 510 | 46 | (²) | 44.8 |
| 9 | | 100 | | | 50 | 1.5 | | | | 1,850 | 2,700 | 410 | 70 | 50.3 | 77.8 |
| 10 | | 100 | | | 50 | 1.5 | 2.5 | | | 1,850 | 2,540 | 380 | 70 | 54.1 | 78.9 |
| 11 | | 100 | 50 | | | 1.5 | 2.5 | 2.5 | 2.5 | 710 | 2,740 | 690 | 60 | 59.9 | 74.4 |
| 12 | | 100 | | 52.5 | | 1.5 | | 2.5 | 2.5 | 490 | 2,640 | 810 | 59 | 57.5 | 74.8 |
| 13 | | 100 | 50 | | | 1.5 | | 2.5 | 2.5 | 140 | 440 | 780 | 42 | (²) | 51.9 |
| 14 | | 100 | | | 50 | 1.5 | | | | 1,960 | 2,280 | 340 | 73 | 43.3 | 82.5 |
| 15 | | 100 | | | 50 | 1.5 | | 2.5 | 2.5 | 1,480 | 2,630 | 480 | 68 | 43.9 | 80.9 |
| 16 | | 100 | | | 50 | 1.5 | 2.5 | 2.5 | 2.5 | 1,660 | 2,450 | 420 | 75 | 47.9 | 82.4 |

[1] Butadiene styrene rubber contains approximately 6% by weight, rosin acid from polymerization.
[2] Materials too soft to obtain ΔT using conventional testing methods.

TABLE II

| Run No. | Compounding recipe (parts by weight) | | | | | | Physical properties | | | | | |
|---|---|---|---|---|---|---|---|---|---|---|---|---|
| | Cis-polybutadiene | Carbon Black | | Bis(α, α' dimethyl-benzyl) peroxide | Mg stearate | Resin 731 | Modulus 300 percent, p.s.i. | Tensile, p.s.i. | Elongation, percent | ΔT, °F. | Shore hardness | Resilience, percent |
| | | #1 | Unmilled furnace carbon black | | | | | | | | | |
| 1 | 100 | | 50 | 1.5 | 5 | | 1,860 | 2,390 | 370 | 60.8 | 67 | 79.5 |
| 2 | 100 | 50 | | 1.5 | 5 | | 450 | 1,850 | 670 | 88.7 | 54 | 66.7 |
| 3 | 100 | 50 | | 1.5 | 5 | 2.5 | 630 | 2,570 | 700 | 57.1 | 54 | 75.1 |

*Example III*

A series of tests was made to compare the effects of zinc and lead stearates with those from the use of magnesium stearate in compounding cis-polybutadiene containing ball-milled carbon black (Black #1 and cis-polybutadiene described in Example I). Data on these tests are shown in Table III. Curing of test samples was 45 minutes at 307° F.

This example shows that cis-polybutadiene compounded with the ball milled acidic carbon black and either magnesium stearate, zinc stearate or lead stearate has a lower modulus than a similarly cured polymer compounded with unmilled carbon black and magnesium stearate while satisfactory tensile values and satisfactory heat buildup values are also obtained.

*Example II*

A series of tests was made in which a portion of the ball milled black described as Black #1 in Example I was used in compounding cis-polybutadiene. Approximate values of the cis-polybutadiene used in the tests were: cis content 96%, trans content 1.2%, vinyl con-

TABLE III

| Run No. | Compounding | | | | | | | Physical Properties | | | | | |
|---|---|---|---|---|---|---|---|---|---|---|---|---|---|
| | Cis-polybutadiene | #1 | Unmilled furnace carbon black | Bis(α,α'dimethylbenzyl) peroxide | Stearate | | | Modulus 300 percent, p.s.i. | Tensile, p.s.i. | Elongation, percent | ΔT, °F. | Shore hardness | Resilience, percent |
| | | | | | Mg | Zn | Pb | | | | | | |
| 1 | 100 | | 50 | 1.5 | 5 | | | 1,820 | 2,440 | 380 | 54.4 | 65 | 77.3 |
| 2 | 100 | 50 | | 1.5 | 5 | | | 470 | 2,160 | 720 | 82.1 | 50 | 64.0 |
| 3 | 100 | 50 | | 1.5 | | 5 | | 430 | 1,950 | 720 | (¹) | 49 | 63.9 |
| 4 | 100 | 50 | | 1.5 | | | 5 | 510 | 2,100 | 680 | 81.4 | 51 | 64.8 |

[1] Material too soft to obtain ΔT using conventional testing methods.

Examples IV

A series of tests was run to test the effects of ball-milled carbon black in ethylene-propylene copolymer rubber. The ball-milled black was Black #1 described in Example I. Curing of test samples was 45 minutes at 307° F. Data on these tests are shown in Table IV.

This example shows that the incorporation of acidic milled furnace carbon black in an ethylene-propylene copolymer yields a lower modulus rubber with a more desirable tensile value and a more desirable heat buildup value than similarly cured polymers using unmilled furnace carbon blacks.

TABLE IV

| Run No. | Compounding | | | | | | | | Physical Properties | | | | |
|---|---|---|---|---|---|---|---|---|---|---|---|---|---|
| | Ethylene-propylene copolymer | #1 | Unmilled furnace carbon black | Bis($\alpha$, $\alpha'$-dimethylbenzyl) peroxide | MgO | Stearic Acid | Resin 731 | Sulfur | Modulus 300 percent, p.s.i. | Tensile, p.s.i. | Elongation, Percent | $\Delta T$, °F. | Resilience, percent |
| 1 | 100 | | 50 | 4.0 | | | | 0.6 | 1,360 | 2,400 | 510 | 85 | 59.6 |
| 2 | 100 | | 50 | 4.0 | 2.5 | 2.5 | 2.5 | 0.6 | 980 | 2,380 | 650 | 105 | 57.4 |
| 3 | 100 | 50 | | 4.0 | 2.5 | 2.5 | 2.5 | 0.6 | 590 | 2,470 | 800 | 79.7 | 64.1 |

The term "low modulus rubber" is used in this disclosure to mean a rubber having a modulus of less than about 1200 p.s.i. when speaking of styrene-butadiene copolymer and a modulus of less than about 1000 p.s.i. when speaking of ethylene-propylene copolymer and cis-polybutadiene.

As many possible embodiments can be made in this invention without departing from the scope thereof, it is to be understood that all matter herein set forth is to be interpreted as illustrative and not as unduly limiting the invention.

We claim:
1. A process which comprises reacting a polymeric material selected from the group consisting of natural rubber, rubbery homopolymers of conjugated diene monomers having from 4 to 12 carbon atoms per molecule, rubbery copolymers of conjugated diene monomers with compounds containing a vinylidene group and rubbery saturated copolymers with an acidic carbon black formed by grinding carbon black in the presence of oxygen and a metal oxide selected from the group of oxides consisting of magnesium, zinc, cadmium, mercury, calcium, barium, strontium, and lead oxides, the amount of said carbon black being at least 20 parts by weight based upon said polymeric material, with about 0.1 to 10.1 parts by weight of an organic peroxide having the formula

$$R''\text{—}O\text{—}O\text{—}R''$$

wherein each R'' is selected from the group consisting of alkyl, cycloalkyl, aryl, alkaryl, aralkyl, and acyl radicals and contains 1 to 15 carbon atoms and at least one material selected from the group consisting of fatty acids and rosin acids, the organic acids having from 10 through 20 carbon atoms.

2. A vulcanizable composition obtained by mixing 100 parts by weight of a polymeric material selected from the group consisting of natural rubber, rubbery homopolymers of conjugated diene monomers having from 4 to 12 carbon atoms, rubbery copolymers of conjugated diene monomers with compounds containing a vinylidene group and rubbery saturated copolymers, with from about 20 to 100 parts by weight of an acidic carbon black having a pH value of from 2 to 6, said acidic carbon black having been formed by grinding carbon black in the presence of oxygen and from about 0.1 to about 10 parts by weight of at least one metal oxide selected from the group of oxides consisting of magnesium, zinc, cadmium, mercury, calcium, barium, strontium and lead oxides, with about 0.1 to 10.1 parts by weight of an organic peroxide having the formula $$R''\text{—}O\text{—}O\text{—}R''$$

wherein each R'' is selected from the group consisting of alkyl, cycloalkyl, aryl, alkaryl, aralkyl, and acyl radicals and contains 1 to 15 carbon atoms and a reactant material selected from the group consisting of fatty acids and rosin acids, said organic acids being present in an amount of from about 0.1 to about 10 parts by weight and having from 10 through 20 carbon atoms per molecule.

3. A process of heating the resulting mixture of claim 2 to produce a cured product.

4. A process according to claim 3 wherein the curing temperature is within the range from about 200 to 500° F. and the curing time is within the range from about 20 to 150 minutes.

5. A process according to claim 3 wherein the curing temperature is within the range from about 260 to 350° F. and the curing time is within the range from about 30 to 60 minutes and wherein the acidic carbon black is present in an amount of about 40 to 60 parts by weight per 100 parts of the polymer.

6. A composition according to claim 2 wherein the said polymeric material is 100 parts butadiene-styrene copolymer, the carbon black has a pH value of from 4 to 6 present in an amount of from 40 to 60 parts by weight, the organic peroxide is bis($\alpha,\alpha'$-dimethylbenzyl) peroxide present in an amount of from 1 to 2 parts by weight, the metal oxide is magnesium oxide present in an amount of from 2 to 3 parts by weight and the organic acid is abietic acid present in an amount of from 0.1 to 10 parts by weight.

7. A composition according to claim 2 wherein the said polymeric material is 100 parts cis-polybutadiene, the carbon black has a pH of from 4 to 6 present in an amount of from 40 to 60 parts by weight, the organic peroxide is bis($\alpha,\alpha'$-dimethylbenzyl) peroxide present in an amount of from 1 to 2 parts by weight, the metal oxide is magnesium oxide present in an amount of from 2 to 3 parts by weight and the organic acid is stearic acid present in an amount of from 0.1 to 10 parts by weight.

8. A composition according to claim 2 wherein the said polymeric material is 100 parts ethylene-propylene copolymer, the carbon black has a pH value of from 4 to 6 present in an amount of from 40 to 60 parts by weight, the organic peroxide is bis ($\alpha,\alpha'$-dimethylbenzyl) peroxide present in an amount of from 3 to 5 parts by weight, the metal oxide is magnesium oxide present in an amount of from 2 to 3 parts by weight and the organic acid is stearic acid present in an amount of from 0.1 to 10 parts by weight.

9. The composition prepared by the process of claim 1.
10. The composition prepared by the process of claim 3.

References Cited by the Examiner

UNITED STATES PATENTS

| 2,442,330 | 6/1948 | Fuller | 270—89.5 |
| 2,737,502 | 3/1956 | Land et al. | 260—23 |
| 2,867,603 | 1/1959 | Safford et al. | 260 |

(Other references on following page)

UNITED STATES PATENTS

| | | | |
|---|---|---|---|
| 2,877,206 | 3/1959 | Scott | 260 |
| 2,888,424 | 5/1959 | Precopio et al. | 260—94.9 |
| 2,954,356 | 9/1960 | Morrifield | 260—23.7 |
| 2,985,632 | 5/1961 | Willis | 260—41.5 |
| 3,012,016 | 12/1961 | Kirk et al. | 260—94.9 |
| 3,024,092 | 3/1962 | Gessler | 260—41.5 |
| 3,033,835 | 5/1962 | Adamek et al. | 260—23.7 X |
| 3,105,057 | 9/1963 | Medalia | 260—94.9 |
| 3,129,204 | 4/1964 | Gilmont | 260—83.3 |

OTHER REFERENCES

"Compounding Ingredients for Rubber" (1961), pp. 97, 100 and 278.

Wolf, "Rubber Age," vol. 80, February 1957, pp. 830 and 831.

LEON J. BERCOVETZ, *Primary Examiner.*

MILTON STERMAN, *Examiner.*

T. D. KERWIN, R. A. WHITE, *Assistant Examiners.*